United States Patent [19]

Armstrong, Jr. et al.

[11] Patent Number: 5,758,137
[45] Date of Patent: May 26, 1998

[54] METHOD AND SYSTEM FOR PROCESSING TIMER REQUESTS WITHIN A COMPUTER

[75] Inventors: William Joseph Armstrong, Jr.; Lynn Scott Waggie, both of Rochester, Minn.

[73] Assignee: International Business Machines Corporation, Armonk, N.Y.

[21] Appl. No.: 548,631

[22] Filed: Oct. 26, 1995

[51] Int. Cl.[6] .................................................. G06F 1/04
[52] U.S. Cl. ................................................... 395/557
[58] Field of Search ........................... 395/557, 185.08

[56] References Cited

U.S. PATENT DOCUMENTS

| | | |
|---|---|---|
| 4,321,687 | 3/1982 | Parsons et al. |
| 4,393,446 | 7/1983 | Gurr et al. |
| 4,642,756 | 2/1987 | Sherrod |
| 5,042,005 | 8/1991 | Miller et al. |
| 5,204,957 | 4/1993 | Wilkie et al. |
| 5,280,628 | 1/1994 | Nakayama |
| 5,297,275 | 3/1994 | Thayer |
| 5,412,803 | 5/1995 | Bartow et al. |

OTHER PUBLICATIONS

IBM Technical Disclosure Bulletin, vol. 28, No. 4, Sep. 1985, "High Speed Software Interval Timer".

Primary Examiner—Thomas M. Heckler
Attorney, Agent, or Firm—Andrew J. Dillion

[57] ABSTRACT

A method for processing timer requests efficiently by reducing overhead and by increasing scalability within a computer system is disclosed. A timer request having a wake-up time of moderate length and a high tolerance level such that the wake-up time does not have to be very precise, is placed in a drop-off queue which is made up of an unsorted double-linked list. The timer request is then periodically hashed from the drop-off queue into an appropriate element of a timer request array, according to the time duration of the timer request. The timer request array is then processed in order to migrate the timer request towards the [0,0] element of the timer request array. Finally, the timer request is awakened when the time request reaches the [0,0] element or a [0,n] element of the timer request array with no time remaining.

15 Claims, 6 Drawing Sheets

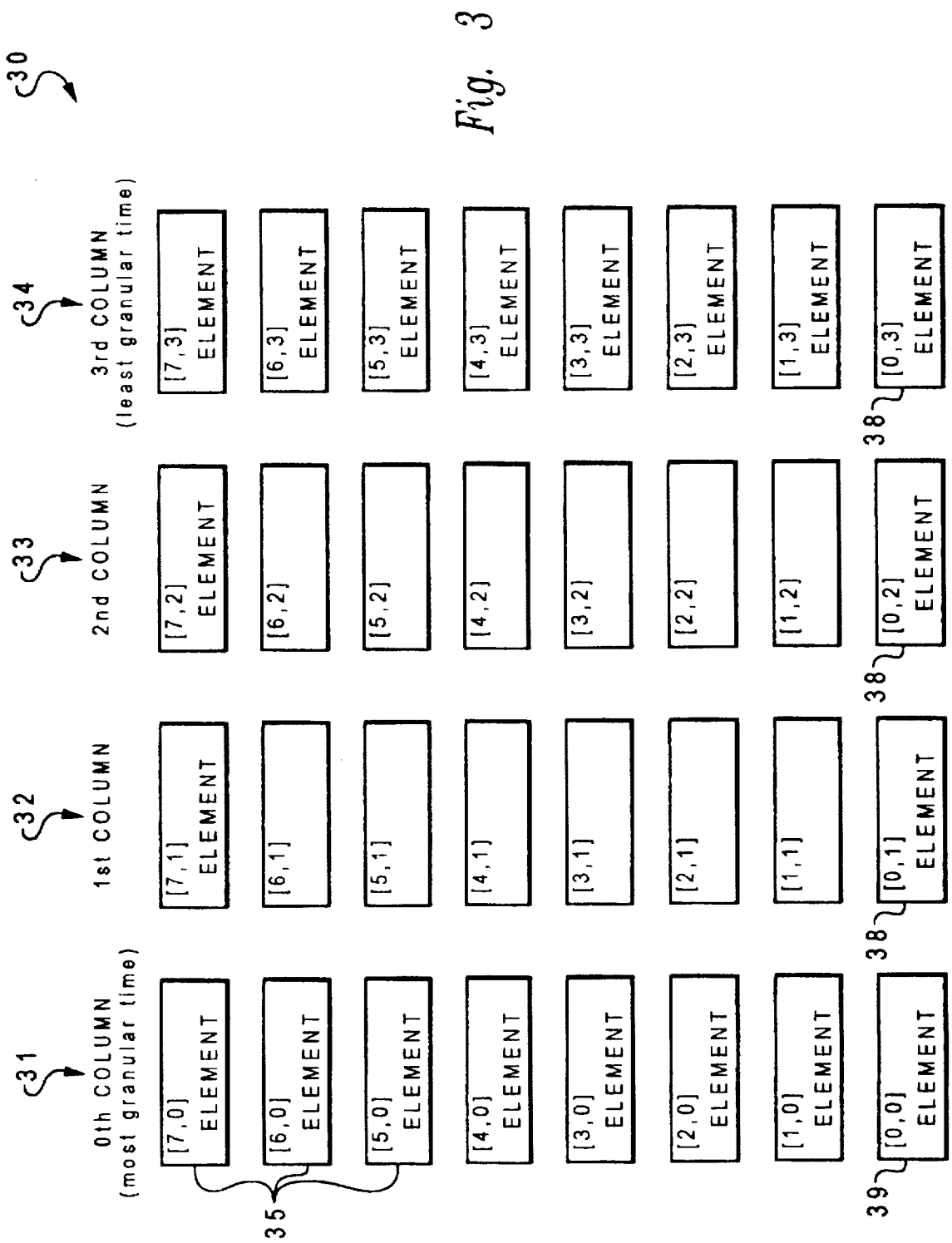

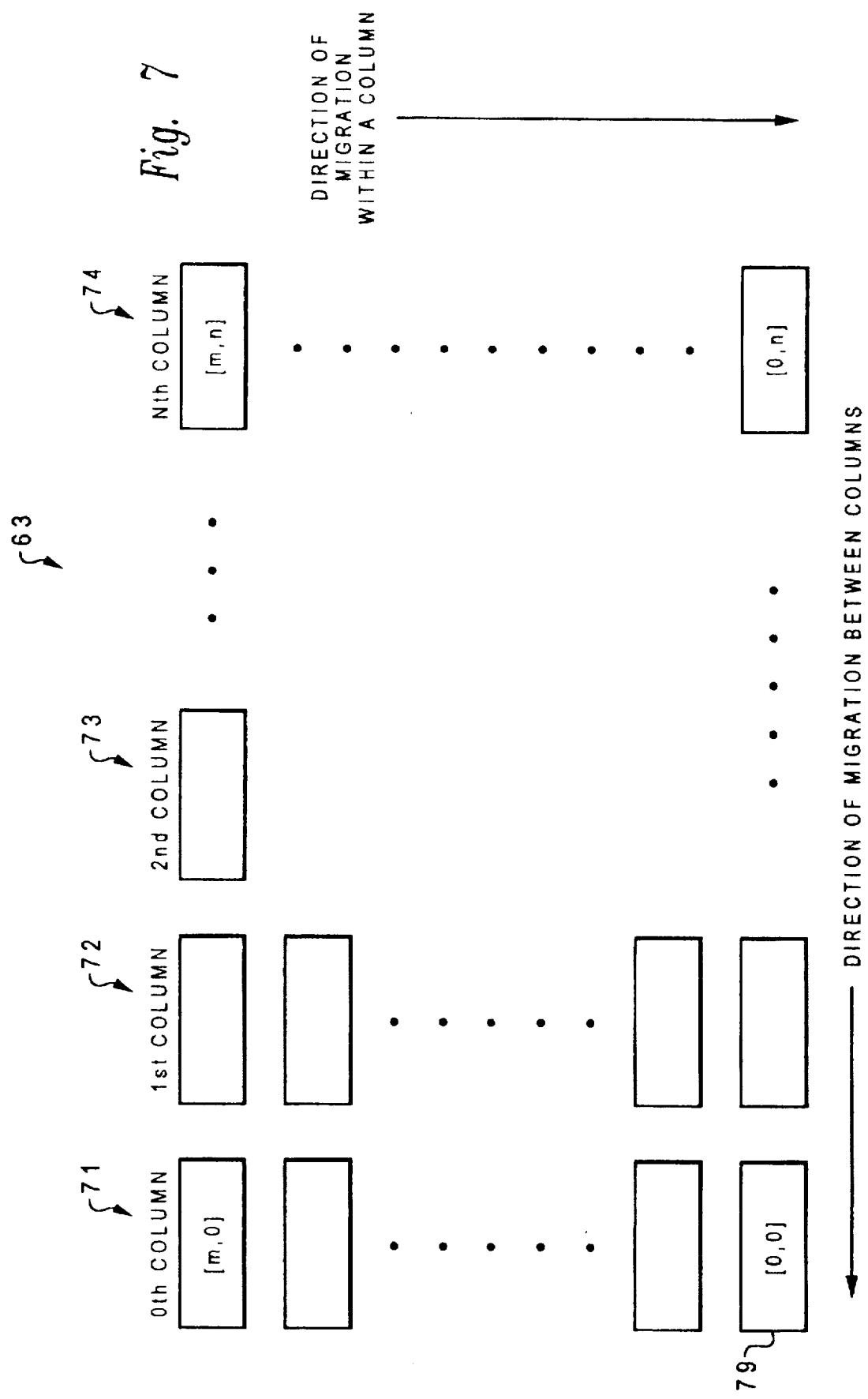

METHOD AND SYSTEM FOR PROCESSING TIMER REQUESTS WITHIN A COMPUTER

BACKGROUND OF THE INVENTION

1. Technical Field

The present invention relates to a method and system for data processing in general, and in particular to a method for processing timer requests within a computer system. Still more particularly, the present invention relates to an improved method for processing timer requests under a low overhead and high scalability scheme within a computer system.

2. Description of the Prior Art

An operating system within a computer system typically contains a software component commonly referred to as timer service. The timer service acts as an interface between the hardware interval timer and various operating system components or application program processes. A client process can utilize the timer service for scheduling some desired events to occur after a specified time duration via a "timer request." After the specified time duration of the timer request has expired, the timer request will be "awakened" so that it may perform the scheduled events.

Typically, the timer service within an operating system includes a sorted queue. New timer requests are inserted into the sorted queue by using a key based on the time duration or "wake-up time" of the pending timer requests. The hardware interval timer of the computer system will then be set to the remaining time duration of the pending timer request at the head of the sorted queue, and a timer request will be awakened upon the expiration of such time duration in the hardware interval timer. However, the insertion of a new timer request into the sorted queue requires a great deal of processing overhead in order to determine the proper insertion point. This is true regardless of the data structure, such as double-linked list, binary tree, etc., that is chosen to implement the sorted queue.

In addition, there is also a scalability problem associated with the implementation of the prior art timer request. The problem occurs when the number of pending timer requests starts to increase. The increasing number of timer requests causes the overhead for processing these timer requests to grow with the increasing system load.

Furthermore, if the pending timer request is cancelled prior to its scheduled wake-up time, any effort associated with the insertion of the pending request into the sorted queue would have been wasted. This scenario is quite common when a timer request is utilized as a "watchdog" timer. In fact, it has been observed that most timer requests which are scheduled for a relatively short wait time (e.g. sub-second) are likely to complete normally, while the majority of the timer requests which are scheduled for a relatively long wait time (e.g. seconds) are normally cancelled well before their specified wake-up time.

Consequently, it would be desirable to design a method and system that can process timer requests more efficiently within a computer system.

SUMMARY OF THE INVENTION

In view of the foregoing, it is therefore an object of the present invention to provide an improved method and system for data processing.

It is another object of the present invention to provide an improved method and system for processing timer requests within a computer system.

It is yet another object of the present invention to provide an improved method and system for processing timer requests under a low overhead and high scalability scheme within a computer system.

In accordance with the method and system of the present invention, a timer request having a wake-up time of moderate length and a high tolerance level such that the wake-up time does not have to be very precise, is first placed at the end of a drop-off queue which is implemented as an unsorted double-linked list. The timer request is then periodically hashed from the drop-off queue into an appropriate element of a two-dimensional timer request array, according to the time duration of the timer request. The timer request array is then processed in order to migrate the timer request towards the [0,0] element of the timer request array. Finally, the timer request is awakened when the timer request reaches the [0,0] element or a [0,n] element of the timer request array with no time remaining.

All objects, features and advantages of the present invention will become apparent in the following detailed written description.

BRIEF DESCRIPTION OF THE DRAWINGS

The invention itself as well as a preferred mode of use, further objects and advantage thereof, will best be understood by reference to the following detailed description of an illustrative embodiment when read in conjunction with the accompanying drawings, wherein:

FIG. 3 is a diagram depicting a timer request array for a timer request according to a preferred embodiment of the invention;

FIG. 7 is a block diagram depicting a generic timer request array of dimension M+1 row by N+1 column.

DETAILED DESCRIPTION OF PREFERRED EMBODIMENT

The present invention may be implemented on a variety of computers under a number of different operating systems. The computer may be, for example, a personal computer, a mini-computer or a mainframe computer. The computer may be a stand-alone system or part of a network such as local area network (LAN) or wide area network (WAN). For the purpose of illustration, a preferred embodiment of the present invention as described below is implemented on a mini-computer, such as the AS/400™ series manufactured by International Business Machines, Inc., under the operating system OS/400™ which is also manufactured by International Business Machines, Inc.

Figure 1:
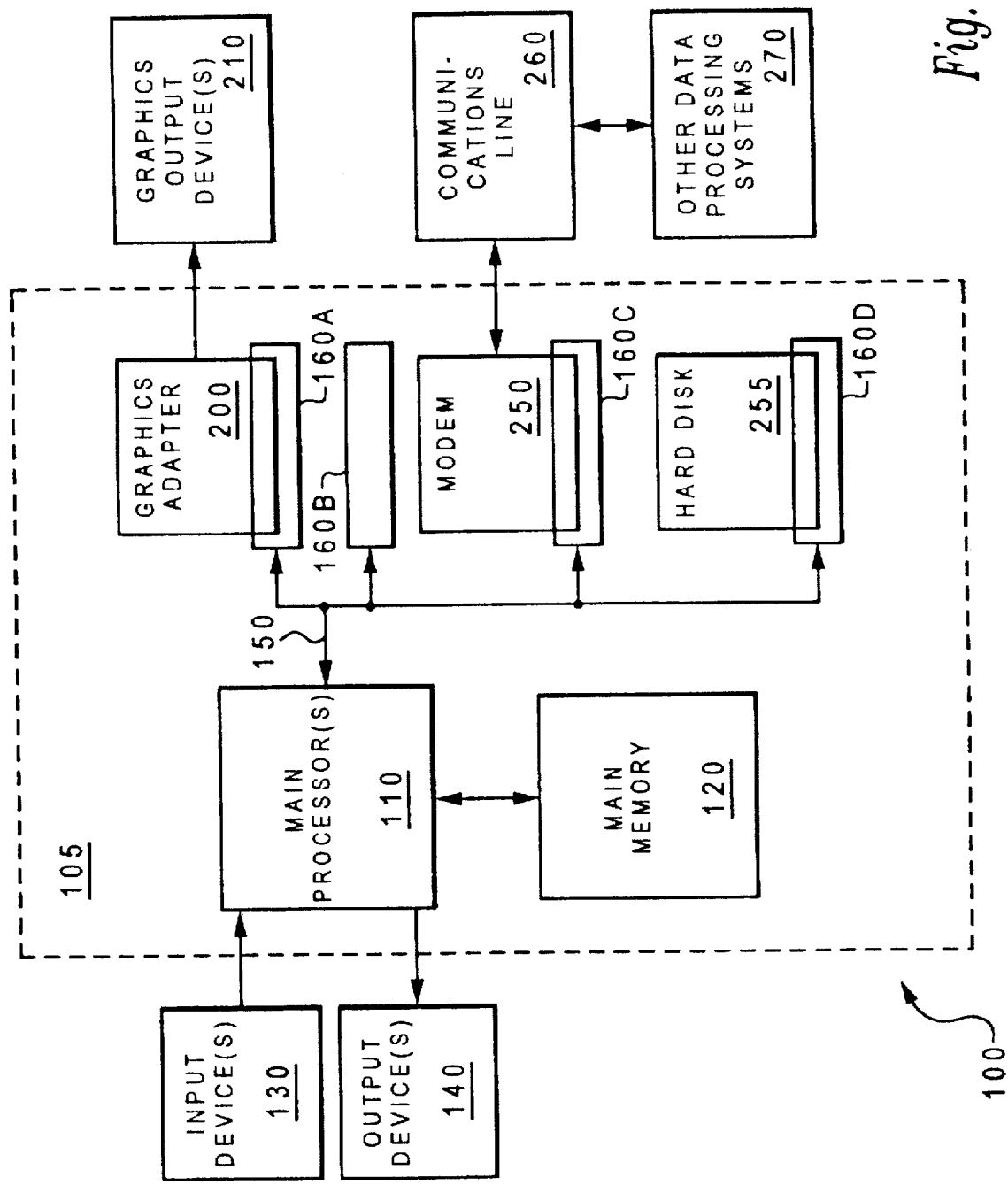
FIG. 1 is a block diagram of a typical digital computer utilized by a preferred embodiment of the invention.

With reference now to the figures and in particular with reference to FIG. 1, there is depicted a block diagram of a digital computer 100 utilized by a preferred embodiment of the present invention. Digital computer 100 typically includes main processor(s) 110 coupled to a main memory 120 within processor unit 105, having input device(s) 130 and output device(s) 140 attached thereto. Main processor(s) 110 may include a single processor or multiple processors. Input device(s) 130 may include a keyboard, mouse or other types of input device. Output device(s) 140 may include a monitor, plotter or other types of output device. A number of peripheral devices may be added to adaptor slots 160A, 160B, 160C and 160D in order to provide communications with main processor 110 via bus 150. As shown in FIG. 1, graphics adapter 200, modem 250 and hard disk 255 are located in adaptor slots 160A, 160C and 160D respectively, while adaptor slot 160B remains open. Graphics adapter 200 receives instructions regarding graphics from main processor 110 via bus 150, thereby rendering the desired graphics output from main processor 110 to graphics output device(s) 210. Modem 250 may communicate with other data processing systems 270 across communications line 260.

As a preferred embodiment of the invention, two important elements are preferably present, namely, a drop-off queue and a timer request array. Also, in a preferred embodiment of the invention, both the drop-off queue and the timer request array are periodically processed by a software service routine.

Drop-off Queue

Figure 2:
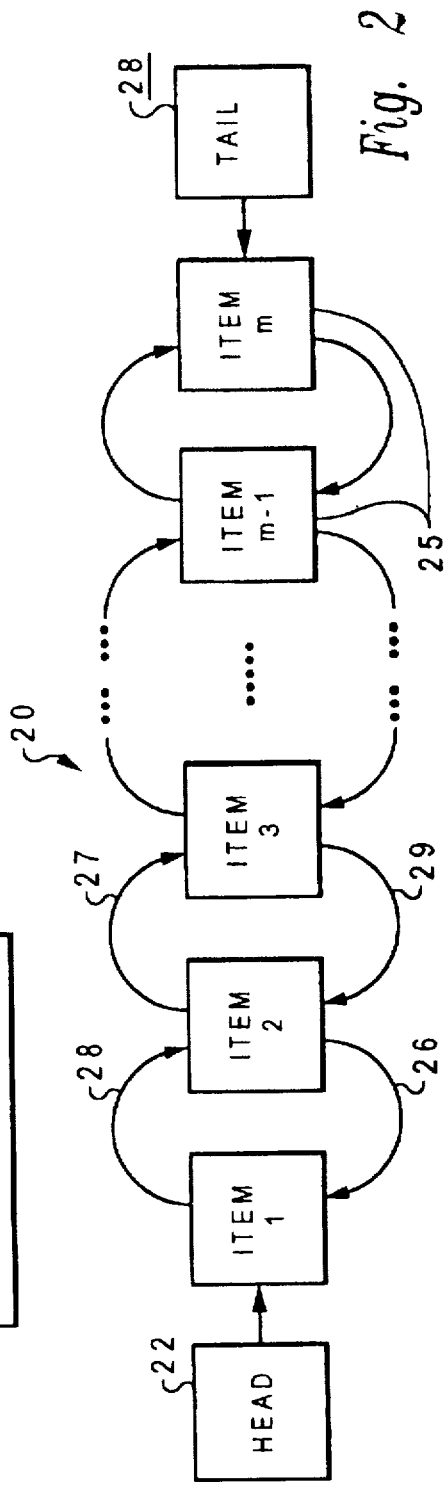
FIG. 2 is a diagram depicting a drop-off queue for a timer request according to a preferred embodiment of the invention.

Referring now to FIG. 2, there is illustrated a block diagram of a drop-off queue 20. Drop-off queue 20 is preferably a double-linked list comprising a head 22, a tail 28 and a number of items 25 in between. Head 22 and tail 28 are pointers pointing respectively to the first item and the last item in drop-off queue 20. In a preferred embodiment of the invention, the number of items 25 between head 22 and tail 28 of drop-off queue 20 varies, depending upon the number of timer requests made. Variable length drop-off queue 20 provides the scalability. Except for head 22 and tail 28, each of the items 25 in drop-off queue 20 has a pointer pointing to its adjacent items, and at the same time, a pointer from its adjacent items pointing to itself. For example, item 2 has pointer 26 pointing to item 1 and pointer 27 pointing to item 3, while item 1 has pointer 28 and item 3 has pointer 29 separately pointing to item 2. The advantage of a double-linked list drop-off queue is that any item on the queue can easily be removed from the queue without linearly traversing the whole queue from either the beginning or the end in order to determine the location of the removed item. Thus, only minimal processing overhead is required for cancelling a timer request within unsorted drop-off queue 20. This is important when there is a large number of timer requests on drop-off queue 20 and especially, most of these timer requests will be cancelled soon after they are initiated. Hence, drop-off queue 20 essentially serves as a holding tank for all incoming timer requests and allows most of the scheduling or cancelling flux to take place, while only minimal processing of the timer request is required.

Timer Request Array

Referring now to FIG. 3, there is illustrated a block diagram of a timer request array 30. In a preferred embodiment of the invention, timer request array 30 is a two-dimensional array having a number of "elements." As shown in FIG. 3, timer request array 30 is 8 row by 4 column. The leftmost column of timer request array 30 is $0^{th}$ column 31 and the rightmost column of timer request array 30 is $3^{rd}$ column 34. Each column of timer request array 30 is further divided into eight elements 35. In $0^{th}$ column 31, each element 35 has a processing period of approximately $\frac{1}{8}$ second, and thus all eight elements 35 together comprise 1 second. Similarly, $1^{st}$ column 32 is divided into eight elements 35 spanning approximately 1 second per element 35; $2^{nd}$ column 33 is divided into eight elements 35 spanning approximately 8 seconds per element 35; and $3^{rd}$ column 34 is divided into eight elements 35 spanning approximately 64 seconds per element 35. As a preferred embodiment of the invention, the above allocation scheme for the time period in each element 35 within timer request array 30 is based on the hash algorithm that has been chosen to match the characteristics of the hardware interval timer, such that the wait time between columns can simply be determined by shifting a specified number of bit positions to the right. Timer request array 30 is intended to serve two purposes. First, as with drop-off queue 20, timer request array 30 also acts as an unsorted staging layer for processing timer requests and absorbing the brunt of the cancelling flux; and second, timer request array 30 allows similar timer requests to be grouped under a common wake-up time according to their respective wake-up time such that the task of waking up multiple timer requests can be accomplished in a single hardware timer interrupt. This method is more efficient than the prior art implementation which requires a hardware timer interrupt per pending timer request.

Figure 4:
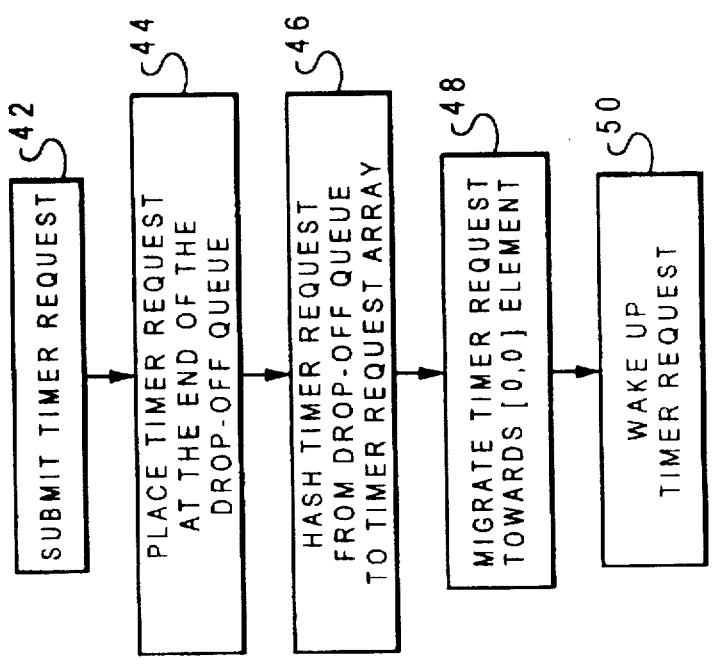
FIG. 4 is a high level logic flow diagram illustrating the method of processing a timer request within a computer system according to a preferred embodiment of the invention.

Referring now to FIG. 4, there is illustrated a high level logic flow diagram for the method of processing a timer request according to a preferred embodiment of the invention. Starting at block 42, a timer request is submitted by a client process. The timer request is then placed at the end of the drop-off queue (as shown in FIG. 2) at block 44. Tail 28 (in FIG. 2) of the drop-off queue will now point to this new timer request. Because the precise insertion point at the drop-off queue is not required for the timer request, only minimal overhead is necessary for maintaining the drop-off queue. At this point, probably some of the timer requests in the drop-off queue have already been cancelled by their respective client process prior to the scheduled wake-up time of the timer request.

Periodically, a software routine called array service routine (details on this later) processes the drop-off queue and subsequently, at block 46, hashes any timer request that remains in the drop-off queue into an appropriate element of the timer request array (as shown in FIG. 3) based on the wait time of the timer request. As in the case within the drop-off queue, some of the timer requests may also be cancelled after they reached the timer request array.

Periodically, the array service routine also processes the timer request array and then migrates the remaining timer requests, at block 48, towards a [0,0] element 39 (in FIG. 3) of the timer request array. The migration process performed by the array service routine continues until the wake-up time of the timer request has come, which is indicated by one of the following two situations: (1) the timer request reaches [0,0] element 39, or (2) the timer request reaches any [0,n] element 38 with no time remaining. As shown in FIG. 3, [0,n] element 38 is the first element for each column of timer request array 30, where n is a non-zero integer indicating the order of the column.

Finally, if one of the above two situations occurs, which means the time duration for the timer request has fully elapsed, then that particular timer request will be awakened and the process terminates at block 50.

As mentioned above, throughout the whole process shown in FIG. 4, a client process can cancel its initiated timer request at any time. In this preferred embodiment of the invention, because both the drop-off queue and the timer request array elements are double-linked lists, and the timer request knows which double-link list it is enqueued on by a pointer indicating such, the timer request can quickly and efficiently be removed from either the drop-off queue or the timer request array.

Array Service Routine

The array service routine is part of a repeating software routine set up for the timer service. The processing period of the array service routine is equal to the processing granularity of the first column in the timer request array, e.g. approximately ⅛ second for each element in $0^{th}$ column 31 of timer request array 30 in FIG. 3. In a preferred embodiment of the invention, the duties of the array service routine include processing ready requests in the [0,0] element of the timer request array, scrolling through the higher order elements of the timer request array, and hashing requests from the drop-off queue into an appropriate element of the timer request array.

Figure 5:
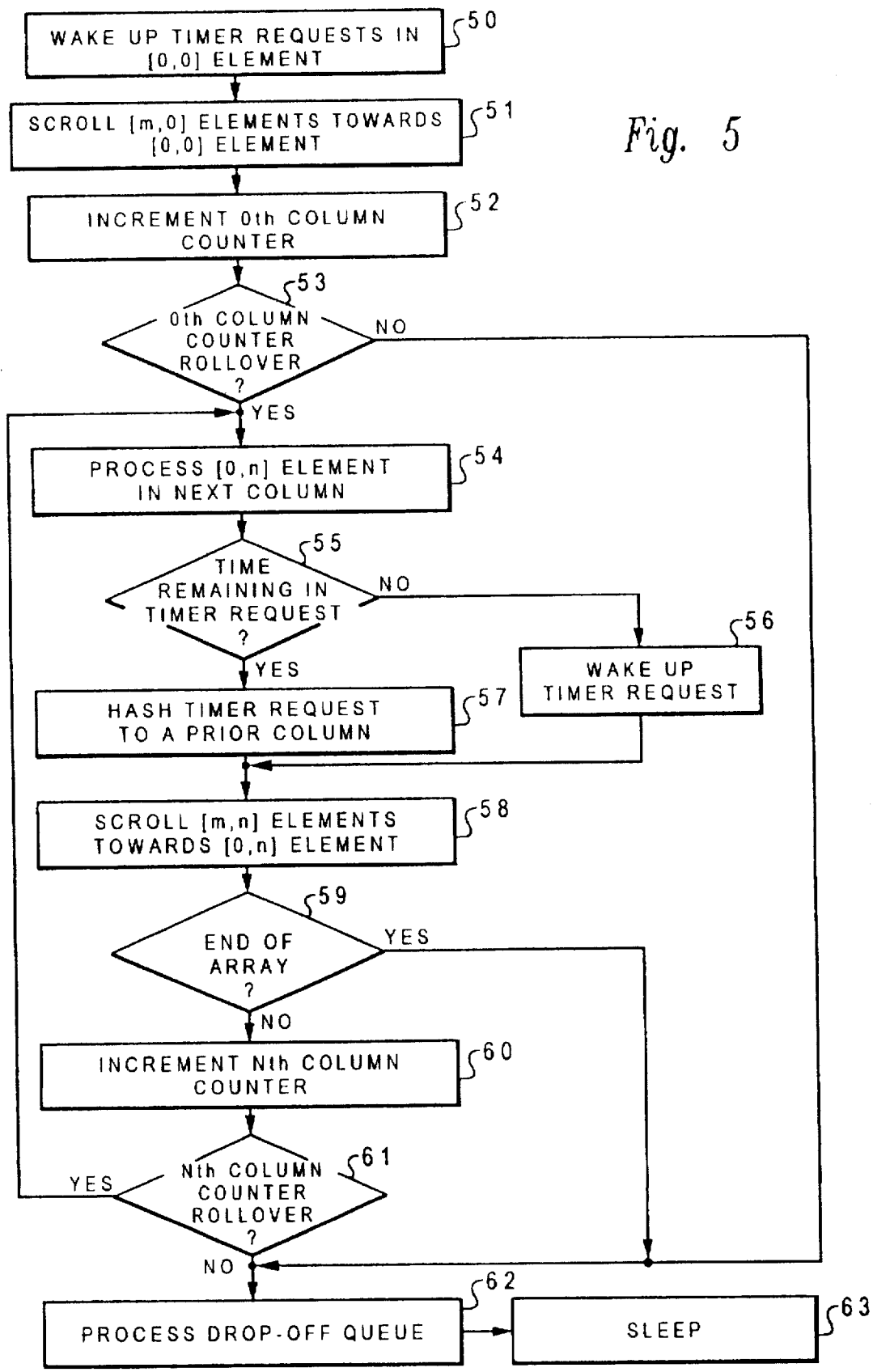
FIG. 5 is a high level logic flow diagram of an array service routine according to a preferred embodiment of the invention.

Referring now to FIG. 5, there is depicted a high level logic flow diagram of the array service routine for processing the drop-off queue and the timer request array according to a preferred embodiment of the invention. Starting at block 50, the routine first awakens any ready timer requests in the [0,0] element of the timer request array, e.g., [0,0] element 39 of timer request array 30 in FIG. 3.

Next, at block 51, the elements in the $0^{th}$ column are scrolled towards the [0,0] element so that the [1,0] element becomes the [0,0] element, the [2,0] element becomes the [1,0] element, etc. In reality, the timer requests are not physically copied from one element to another when the column scrolls; rather, only the pointers to the elements are scrolled. For example, each element in the $0^{th}$ column is scrolled as follows:

Physical element number: 0 1 2 3 4 5 6 7

Logical element number before scrolling: 3 4 5 6 7 0 1 2

Logical element number after scrolling: 4 5 6 7 0 1 2 3

The scrolling continues on throughout the entire $0^{th}$ column. The $0^{th}$ column counter is incremented at block 52. A determination is then made, at block 53, as to whether or not the $0^{th}$ column counter has been rolled over. The $0^{th}$ column counter will be rolled over when all the elements within the $0^{th}$ column have been processed. If the $0^{th}$ column counter has not been rolled over, the routine jumps to block 62, otherwise, the first element ([0,n]) of the next column in the timer request array is processed at block 54. A determination is made, at block 55, as to whether there is any time remaining in a timer request in [0,n] element. If there is no time left in the timer request, the timer request is awakened at block 56 and the routine jumps to block 58, otherwise, the timer request is hashed into an appropriate element of a prior column, at block 57, using the time remaining. In a preferred embodiment of the invention, the prior column can be any preceding column rather than limited to the column adjacent. At block 58, the elements within the $n^{th}$ column is scrolled towards the first element ([0,n]) of the $n^{th}$ column. For example, in $1^{st}$ column 32 of timer request array 30 of FIG. 3: [0.1 ]→[1,1], [1,1]→[2,1]. . . [7,1 ]→[0,1]. A determination is then made, at block 59, as to whether or not the end of the timer request array has been reached. If the end of the array is reached, the routine jumps to block 62, otherwise, the $n^{th}$ column counter is incremented at block 60.

Afterwards, a determination is made, at block 61, as to whether or not the $n^{th}$ column counter has been rolled over. If the $n^{th}$ column counter has been rolled over, the routine jumps back to block 54. If the $n^{th}$ column counter has not been rolled over, the routine then processes the drop-off queue, at block 62, by hashing any timer request from the drop-off queue into an appropriate element of the timer request array, with the wait time of the timer request. Finally, the routine goes to sleep at block 63.

Implementation

Figure 6:
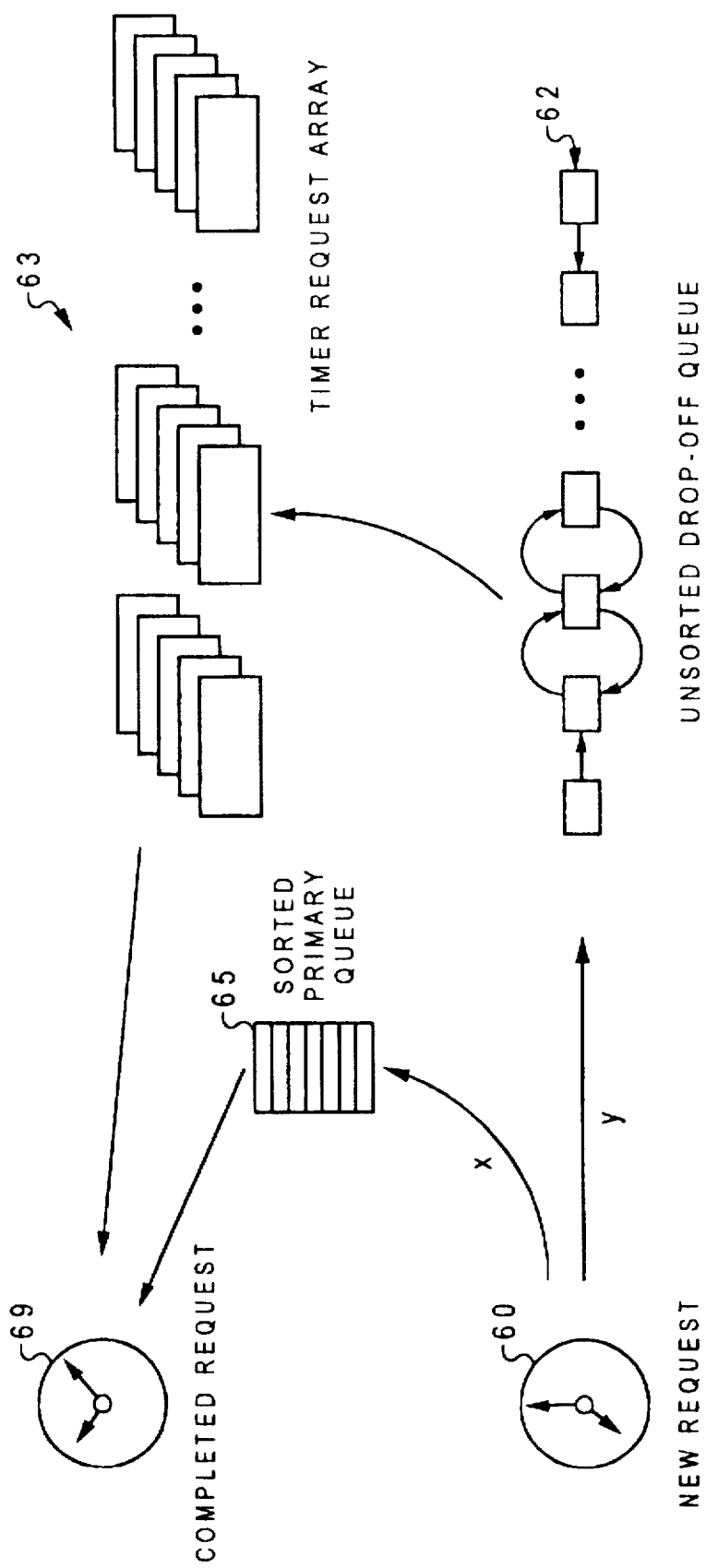
FIG. 6 is a diagram illustrating an implementation of the present invention.

Referring now to FIG. 6, there is illustrated a flow diagram for the implementation of the present invention. The flow diagram begins with a new timer request 60 initiated by a client process. If new timer request 60 is a one-time request with a very small or a very large wake-up time, or with a low tolerance level such that the wake-up time is precise, then new timer request 60 will follow path x and be enqueued into a sorted primary queue 65—basically the prior art. This is because when timer request 60 is specified with a wake-up time that is either smaller than the granularity of $0^{th}$ column of timer request array 63 or larger than the range of time defined by timer request array 63, then new timer request 60 simply cannot be fitted into timer request array 63. Furthermore, it is probably more suitable for a timer request with a tolerance level that is too low for grouping under a common wake-up time to be processed under the prior art rather than the present invention. When new timer request 60 is placed in sorted primary queue 65, it is expected that new timer request 60 will be completed normally. In some instances, if new timer request 60 has a wake-up time that is sooner than the time interval of the hardware interval timer, the time interval of the hardware interval timer may be reset to a new and shorter interval to accommodate those situations when necessary.

Similarly, if new timer request 60 is a recurring timer request or has specified an absolute wake-up time-of-day, new timer request 60 will also follow path x to be handled by sorted primary queue 65 as in the prior art design. Again, these kinds of timer requests are expected to be completed normally.

Contrarily, if new timer request 60 is a one-time request with a wake-up time of moderate length and a high tolerance level such that the wake-up time does not have to be very precise, then new timer request 60 is immediately added to unsorted drop-off queue 62 via path y. A moderate wake-up time length means the wait time is larger than the granularity of the $0^{th}$ column of timer request array 63, and is still small enough to be contained within the range of time defined by timer request array 63. In addition, the specified tolerance level of new timer request 60 must also be broad enough to allow the grouping of new timer request 60 at a boundary equal to the granularity of the $0^{th}$ column of timer request array 63, and the assessment of time-of-day clock is not required for new timer request 60. As mentioned previously, because drop-off queue 62 is unsorted, only minimal time overhead is necessary for processing new timer request 60 prior to and after the drop-off.

For the majority of client implementations, a timer request is usually cancelled soon after the timer request is scheduled. Hence, most of the new timer requests that met the pre-requisites for entering drop-off queue 62 only "live" on drop-off queue 62 and never further move into timer request array 63. Thus, all of the processing overhead involved with enqueing any new timer request into sorted primary queue 65 can be avoided. Furthermore, the cancel operation of any timer request within drop-off queue 62 is also very efficient because it merely involves the removal of one item from a double-linked list.

At this point, if new timer request 60 still has not yet been cancelled within drop-off queue 62, new timer request 60 will be hashed into one of the elements in timer request array 63 the next time the array service routine runs. New timer request 60 is placed into an element which represents a wait time just beyond a specified nominal wait time of new timer request 60, but within its specified wait time tolerance range. The hash algorithm can be carefully chosen to match the characteristics of the hardware interval timer. Ideally, the wake-up time can be shifted to the right a required number of bit positions to resolve to the granularity of an element within timer request array 63, as in a preferred embodiment of the invention.

The hashing process proceeds as follows. Referring now to FIG. 7, there is depicted a block diagram of timer request array 63 of dimension M+1 row by N+1 column. An attempt is first made to hash new timer request 60 into one of the elements in $0^{th}$ column 71 of timer request array 63. If the wake-up time of new timer request 60 is too distant to fit within the range of $0^{th}$ column 71, the wake-up time will be checked against the range of the successive columns, such as $1^{st}$ column 72, $2^{nd}$ column 73, etc., until a column with the proper range is found. If new timer request 60 is scheduled for a time beyond the range of entire timer request array 63, new timer request 60 will be placed directly into sorted primary queue 65 (of FIG. 6), as mentioned above. Whether the wake-up time of new timer request 60 falls within the range of timer request array 63 may be determined before timer request 60 is placed in drop-off queue 20.

A further attempt is made to align new timer request 60 with several other timer requests within the same column on a common wake-up time boundary, thereby enabling multiple timer requests to be awakened together when the hardware interval timer expires at that boundary. Again, as mentioned above, if new timer request 60 does not have a sufficient tolerance level to be allowed for such grouping, timer request 60 would be placed on sorted primary queue 65 (of FIG. 6) in the first place. Nevertheless, it is crucial for a client process to make every attempt for allowing sufficient tolerance in the specified wake-up time for new timer request 60 such that several timer requests can be grouped under a common wake-up time of day in order to avoid the placement of new timer request 60 into sorted primary queue 65.

If new timer request 60 lives long enough after it is placed in timer request array 63, new timer request 60 will migrate through the elements within timer request array 63. In a preferred embodiment of the invention as shown in FIG. 7, the direction of migration within a column for timer request 60 is from high order elements to low order elements (top to bottom); and the direction of migration between columns for timer request 60 is from high order columns to low order columns (right to left). As the wake-up time of new timer request 60 nears, new timer request 60 migrates toward $0^{th}$ column 71 and eventually arrives at [0,0] element 79 of request timer array 63. New timer request 60 is then processed with the other timer requests in [0,0] element 79 by the array service routine.

The migration process proceeds as follows. First, items in the [0,n] element are hashed into a proper element of any prior columns (i.e., n-$1^{th}$ column, n-$2^{th}$ column, etc.), unless there is no wait time remaining in that particular timer request. Next, all the timer requests in the $n^{th}$ column elements are periodically moved towards the [0,n] element. The migration goes so on until each timer request reaches $0^{th}$ column 79. Any timer request remaining in [0,0] element 79 when the array service routine runs has reached its requested normal wake-up time, and is ready to be awakened. Ideally, there should be very few timer requests still remaining in timer request array 63 at this time, as most of the timer requests should have been cancelled long before their normal specified completion time.

During migration, the elements within timer request array 63 in effect scroll about themselves. When $0^{th}$ column 71 is processed, items in the [m,0] element migrate towards [0,0] element 79. After the processing period within $0^{th}$ column 71 has passed, $1^{st}$ column 72 is then processed. Successive columns within timer request array 63 are processed in an ascending order, from the lowest order $0^{th}$ column 71 with the most granular time to the highest order $N^{th}$ column 74 with the granular time. When the highest order $N^{th}$ column 74 is processed, items in the [M,N] element migrate towards the [0,N] element. Thus, items in [1,N] element are scrolled into the [0,N] element, and the last element of the highest order column, i.e. [M,N] element, now becomes empty.

Finally, when new timer request 60 reaches the [0,0] element 79 of timer request array 63 or reaches any first element ([0,n] element) of any higher order column of timer request array 63 with no time remaining, new timer request 60 is awakened and becomes completed request 69, as shown in FIG. 6. This concludes the service of new timer request 60.

As has been described, the present invention provides an improved method for processing timer requests by reducing overhead and by improving scalability within a computer system. By taking advantage of the fact that a majority of timer requests which are scheduled for a relatively long wait time are normally cancelled well before their specified wake-up time, the present invention minimizes the up-front time overhead for processing these timer requests and utilizes an implementation scheme under a paradigm wherein most of these timer requests are normally cancelled, much of the overhead inherent in the old model under the prior art can be eliminated.

While the invention has been particularly shown and described with reference to a preferred embodiment, it will be understood by those skilled in the art that various changes in form and detail may be made therein without departing from the spirit and scope of the invention.

What is claimed is:

1. A method for efficiently processing a timer request by allowing more than one said timer request to be awakened in a single hardware timer interrupt within a computer system, said method comprising:

placing a timer request in an unsorted drop-off queue;

scanning said drop-off queue periodically to hash said timer request from said drop-off queue into an element of a timer request array according to said timer request's time duration;

migrating said timer request towards a [0,0] element of said timer request array; and waking up said timer request when said timer request reaches said [0,0] element or reaches a [0,n] element with no time remaining.

2. The method of processing a timer request by allowing more than one said timer request to be awakened in a single hardware timer interrupt in claim 1, wherein said drop-off queue is a double-linked list.

3. The method of processing a timer request by allowing more than one said timer request to be awakened in a single hardware timer interrupt in claim 1, wherein said drop-off queue is of variable length.

4. The method of processing a timer request by allowing more than one said timer request to be awakened in a single hardware timer interrupt in claim 1, wherein said timer request array is a two dimensional array.

5. The method of processing a timer request by allowing more than one said timer request to be awakened in a single hardware timer interrupt in claim 1, wherein said migrating step is performed by an array service routine.

6. A computer system for efficiently processing a timer request by allowing more than one said timer request to be awakened in a single hardware timer interrupt, comprising:

an unsorted drop-off queue for receiving a timer request;

a timer request array having a plurality of elements for receiving timer requests from said unsorted drop-off queue;

a scanning means for hashing said timer request from said unsorted drop-off queue to said timer request array, wherein said hashing is performed periodically;

migration means coupled to said scanning means for migrating said timer request towards a |0,0| element of said timer request array; and wake-up means coupled to said migration means for waking up said timer request when said time request reaches said [0,0] element or reaches a |0,n| element with no time remaining.

7. The computer system for processing a timer request by allowing more than one said timer request to be awakened in a single hardware timer interrupt in claim 6, wherein said drop-off queue is a double-linked list.

8. The computer system for processing a timer request by allowing more than one said timer request to be awakened in a single hardware timer interrupt in claim 6, wherein said drop-off queue is of variable length.

9. The computer system for processing a timer request by allowing more than one said timer request to be awakened in a single hardware timer interrupt in claim 6, wherein said timer request array is a two dimensional array.

10. The computer system for processing a timer request by allowing more than one said timer request to be awakened in a single hardware timer interrupt in claim 6, wherein said means for migrating said timer request further comprises an array service routine means.

11. A computer program product for efficiently processing a timer request by allowing more than one said timer request to be awakened in a single hardware timer interrupt within a computer system, comprising:

means stored in memory for instructing a processor to place a timer request in an unsorted drop-off queue;

means stored in memory for instructing a processor to scan said drop-off queue periodically to hash said timer request from said drop-off queue into an element of a timer request array according to said timer request's time duration;

means stored in memory for instructing a processor to migrate said timer request towards a [0,0] element of said timer request array; and means stored in memory for instructing a processor to wake up said timer request when said time request reaches said [0,0] element or reaches a [0,n] element with no time remaining.

12. The computer program product for processing a timer request by allowing more than one said timer request to be awakened in a single hardware timer interrupt in claim 11, wherein said drop-off queue is a double-linked list.

13. The computer program product for processing a timer request by allowing more than one said timer request to be awakened in a single hardware timer interrupt in claim 11, wherein said drop-off queue is of variable length.

14. The computer program product for processing a timer request by allowing more than one said timer request to be awakened in a single hardware timer interrupt in claim 11, wherein said timer request array is a two dimensional array.

15. The computer program product for processing a timer request by allowing more than one said timer request to be awakened in a single hardware timer interrupt in claim 11, wherein said means stored in memory for instructing said processor to migrate said timer request further comprises means stored in memory for instructing said processor to service said timer request array.

* * * * *